United States Patent [19]

DePirro

[11] Patent Number: 4,800,917
[45] Date of Patent: Jan. 31, 1989

[54] FLUID ACTUATED GATE VALVE ASSEMBLY

[76] Inventor: Mario DePirro, 133 S. Westmore Ave., Lombard, Ill. 60148

[21] Appl. No.: 144,223

[22] Filed: Jan. 15, 1988

[51] Int. Cl.⁴ .................. F16K 43/00; F16K 31/26; F16K 33/00
[52] U.S. Cl. .................... 137/315; 137/315; 251/28; 251/329
[58] Field of Search .............. 137/412, 413, 625.25, 137/315; 251/327, 329, 25, 28, 326, 328

[56] References Cited

U.S. PATENT DOCUMENTS

| | | | |
|---|---|---|---|
| 1,117,394 | 11/1914 | Joleen | 137/625.25 |
| 1,779,040 | 10/1930 | Hardacker et al. | 137/413 |
| 1,799,849 | 4/1931 | Hardacker et al. | 137/413 |
| 2,081,298 | 5/1937 | Hardacker | 137/412 |
| 2,116,422 | 5/1938 | Anderson | 137/625.25 |
| 2,192,963 | 3/1940 | Davis | 137/413 |
| 2,633,865 | 4/1953 | Mastnock | 137/413 |
| 2,835,270 | 5/1958 | York et al. | 137/412 |
| 3,104,659 | 9/1963 | Smith | 137/625.25 |
| 3,605,799 | 9/1971 | Cherne | 137/413 |
| 4,524,951 | 6/1985 | Green et al. | 137/625.25 |

Primary Examiner—George L. Walton
Attorney, Agent, or Firm—Basil E. Demeur; Robert E. Knechtel; Alan B. Samlan

[57] ABSTRACT

There is disclosed a non-electric fluid actuated gate valve assembly of the type intended for interposition between a static structure and a municipal sewer line to prevent sewer back-up in flood conditions formed by an enclosed chamber having a water inlet and a water outlet spaced therefrom and adapted for placement in the static structure and interposed in the main sewer line thereof, the water inlet having a fluid actuated gate valve assembly associated therewith, the gate valve assembly formed by gate means for alternately opening and closing the water inlet, and fluid actuated control means in operative relation with the gate means and being in fluid communication with the source of fluid under pressure such that the gate means is operated by a fluid under pressure in response to the sewer water level within the enclosed chamber thereby to open and close the gate means alternatively, and in response to the water level within the enclosed chamber.

12 Claims, 2 Drawing Sheets

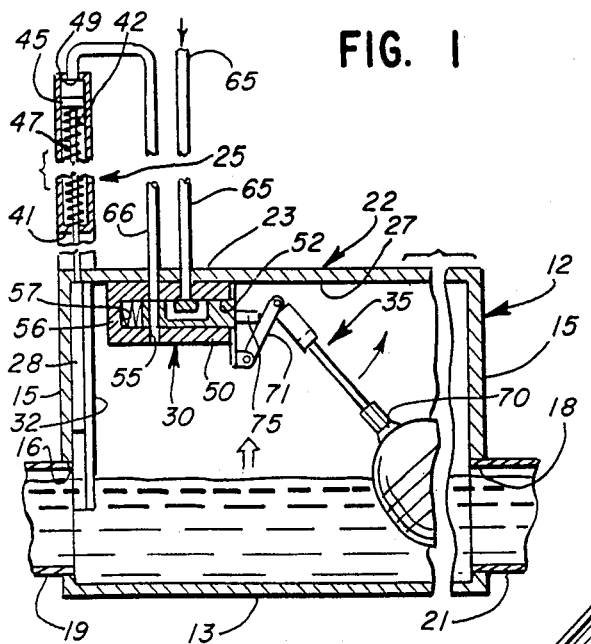
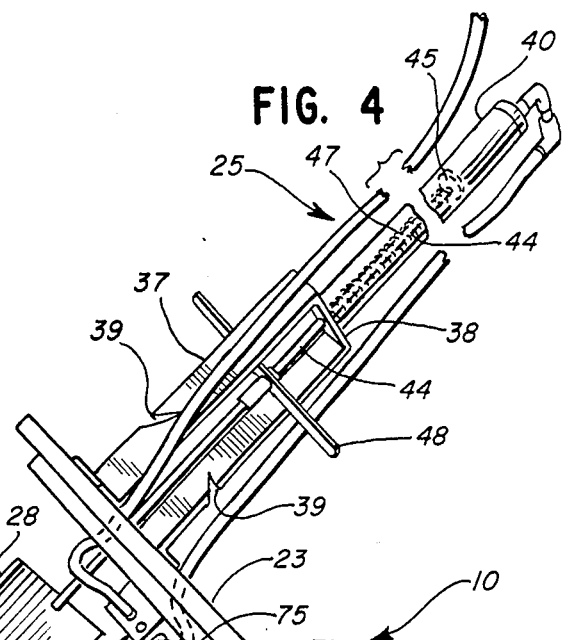
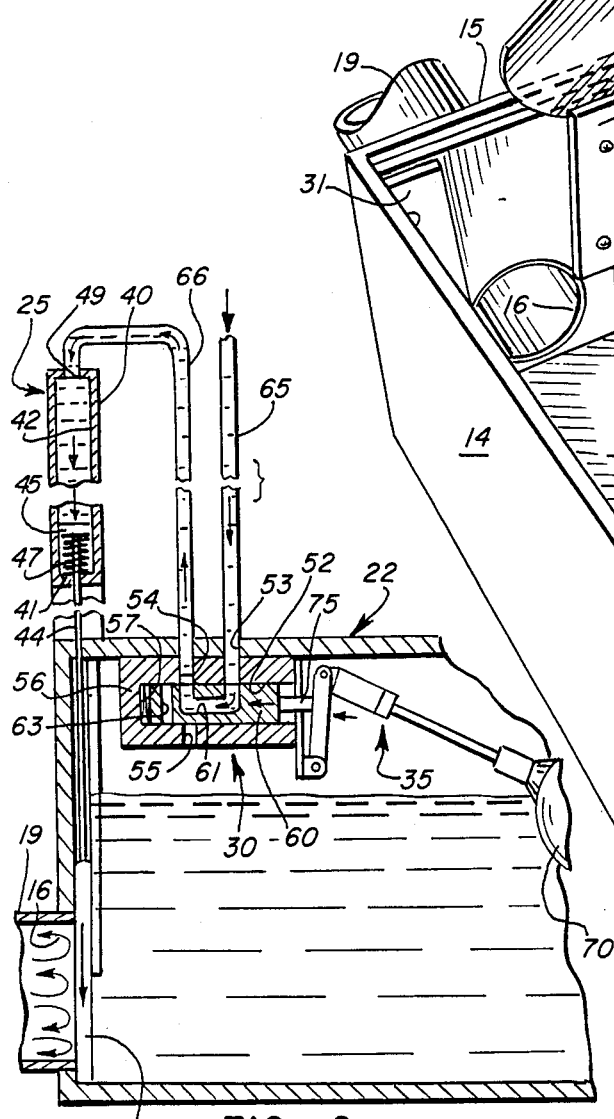
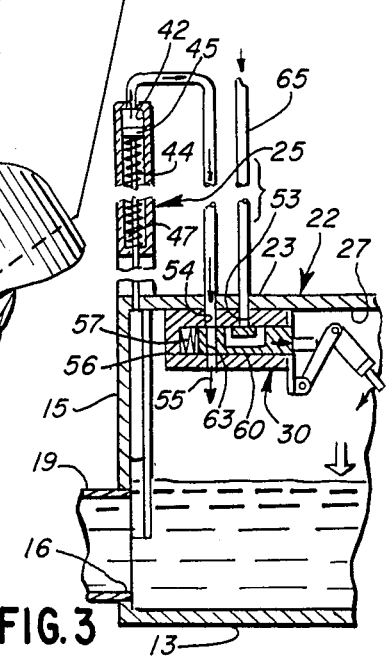

FLUID ACTUATED GATE VALVE ASSEMBLY

BACKGROUND OF THE INVENTION

Various formats and systems have been proposed for providing automatic gate valve assemblies in connection with sewer lines connecting various types of static structures such as residences, or other buildings, and a main municipal sewer line. The purpose of such systems is to prevent the back-up of sewer water or other undesirable types of fluids into the static structures during extreme conditions of the type which cause sewer water or rain water to back-up into the building structures.

Typically, most residences or other structures are provided with sump pumps which are electrically operated for the purpose of taking the sewer water as it backs up into a sewer chamber and pumping the same back into the municipal sewer system. It is well known that such systems are merely intended to operate when temporary back-up situations occur, since the process of simply pumping backed up sewer water back into the municipal system can only operate effectively if the main municipal sewer system can accommodate the reintroduction of the backed up sewer water into the system. It is well known that under extreme conditions, especially those wherein the main sewer system is totally overwhelmed, sump pump systems do not operate effectively. In some installations, sump pump systems have been provided wherein the sump pump operates to take the excess sewer water which is backing up into the sewer holding tank, and pumping the same to a point external of the static structure but not back into the municipal sewer system. In most instances, such installations are not in compliance with local building codes, but in extreme conditions will operate to alleviate some of the excess back-up under extreme conditions.

It is also common knowledge that extreme weather conditions which cause flooding often pertain to those types of weather conditions wherein electrical power is interrupted. In such situations, the solutions which have been proposed to date relate to back-up sump pump systems which are operated either by batteries, or by gasoline or diesel powered generators. It is well known that these types of back-up systems require some type of switching system such that when the electrical power is deactivated, the back-up system, whether it be operated by batteries or by gasoline or diesel power, are activated to turn on in order to accommodate the sewer back-up situation. Unfortunately, back-up systems which are either gasoline or diesel powered usually require the activation of the system by means of manual effort, and therefore, require that manpower be present and employed at the time that the system must be activated. Hence, such systems are not effective back-up systems in such extreme conditions when no one is present to sense the fact that the electrical power has been interrupted. Insofar as battery systems are concerned, such systems are less than effective if the batteries happen to be partially or substantially discharged due to the long periods of time which normally result when such systems lay idle. Furthermore, such systems can be dangerous in terms of extreme back-up conditions since water will be present and in the vicinity of such back-up systems, and if electrically powered, can cause the ever present danger of electrocution.

Applicant herein has heretofore developed an automatic gate valve assembly, which is electrically powered, for the purpose of insuring that in flood conditions, a main gate valve is actuated to operate for the purpose of shutting off the static structure such as a building, from the main municipal sewer line. Such systems generally include water sensing means for sensing the rise of the water level within a chamber, and activating a control mechanism for controlling the activation of the gate valve in order to shut off the water outlet leading to the main sewer line. Such a device is shown in applicant's Pat. No. 4,624,280. Such systems generally have, in common, a system which operates to sense the water level, and in response thereto, activate a controller means for actuating the gate valve to shut the main sewer line from the structure in which the system is located. This, hopefully, prevents sewer water back-up into the building, until the extreme conditions causing the back-up subside afterwhich, the system is designed to reactivate the gate valve to open the same and permit the free flow of sewer water to exit from the static structure.

It has now been determined to be advisable to develop a system which eliminates the need for electrical power for powering the gate valve system. Furthermore, it has been deemed desirable to provide such a system which is simplified in construction, minimizes the number of moving parts, and operates strictly on the presence of fluid pressure rather than electrical power. Hence, the present invention is intended to provide an automatic gate valve system which operates in response to a rise in the sewer water level contained in a sewer holding tank, but the entire system is operated strictly by fluid pressure emanating from a source of fluid under pressure. The present invention is designed to operate by the use of the water pressure line which is interconnected to virtually every static structure which exists. That is, homes, residential buildings, commercial buildings, and other structures are always connected with a main water line through which the structure receives potable water for the structure. It is well known that the water pressure in such water lines generally runs between 30 and 50 pounds per square inch, and is present in the system at all times. The present invention, therefore, contemplates the interconnection of the present gate valve assembly to the water pressure line of the structure and utilizes that water pressure to operate the system.

OBJECTS AND ADVANTAGES

It is therefore the object of the present invention to provide an improved gate valve assembly system of the type intended to prevent sewer back-up in extreme conditions, by providing a fluid actuated control system for controlling the opening and closing of the gate valve assembly relative to the sewer water line.

In conjunction with the foregoing object, it is a further object of the present invention to provide an improved automatic gate valve system wherein the system employs an enclosed chamber interposed between the main municipal sewer line, and the sewer system for the static structure, the enclosed chamber being of the type which includes a water inlet and a water outlet through which sewer water passes from the structure to the main sewer line, and the assembly further provided with a fluid actuated gate valve assembly which includes gate means for alternately opening and closing the water inlet, and a fluid actuated control means in operative relation with the gate means and being in fluid communication with a source of fluid under pressure thereby to operate the control means.

In conjunction with the foregoing object, it is a further object of the present invention to provide a system of the type disclosed wherein the fluid actuated control means includes a fluid actuated controller means which is in operative connection with the gate means for alternately opening and closing the gate means in response to fluid pressure supplied thereto, a valve block means interposed between the chamber and the fluid acuated controller means for controlling the fluid pressure within the controller means, and a valve block actuating means interposed between the chamber and the valve block means for sensing the water level within the chamber and adapted to activate the valve block means in response to a rise in the water level thereby to concommitantly actuate the fluid actuated controller means and close the gate means in a high water condition within the chamber, and alternatively actuate the valve block means and concommitantly the fluid actuated controller means to open the gate means in a low water condition within the chamber, such that the fluid actuated control means is operated by fluid under pressure in order to operate the gate valve assembly without the need of electromotive energy.

In conjunction with the foregoing objects, a further object of the invention is to provide a fluid actuated gate valve system of the type described wherein the valve block means is formed by a fluid actuated controller means which is formed by a hydraulic cylinder being an enclosed chamber and having a cylinder piston mounted therein and adapted for reciprocating movement, the cylinder piston having a piston ring mounted thereon and being in fluid tight sealing relation with respect to the cylinder chamber wall, the cylinder piston having a lower end extending outwardly from the cylinder and being mounted to the gate means thereby to control the reciprocating movement of the gate means in response to the reciprocating movement of the piston within the hydraulic cylinder, and the valve block means for operating the hydraulic cylinder consisting of a valve block housing mounted on the gate valve assembly and having a fluid inlet in fluid communication with a source of hydraulic fluid under pressure, a first fluid outlet in fluid communication with the cylinder fluid inlet and a second fluid outlet positioned therein, the valve block housing having an interior chamber for accommodating a valve block reciprocably carried therein, the valve block having a first fluid flow line formed therein and adapted for operative movement to a position thereby to establish a fluid pathway between the valve block housing fluid inlet in the valve block first fluid outlet, and a second flow line formed therein and adapted for operative movement to a position to establish a fluid pathway between the valve block housing first fluid outlet and the valve block housing second fluid outlet, the respective fluid pathways being designed such that when a fluid pathway is established with the valve block first flow line, the second flow line is occluded, and the establishment of a fluid pathway with the valve block second flow line occludes the valve block's first flow line, and valve block actuating means for controlling the reciprocation of the valve block in response to the water level within the enclosed chamber in order to operate the cylinder piston and concommitantly, operate the gate means to open and close respectively in response to the water level within the chamber.

Further features of the invention pertain to the particular arrangement of the parts whereby the above-outlined and additional operating features thereof are attained.

The invention, both as to its organization and method of operation together with further objects and advantages thereof will best be understood by reference to the following specification taken in connection with the accompanying drawings.

SUMMARY OF THE INVENTION

In summary, the present invention is intended to provide an automatic gate valve system for interposition between a structure such as a dwelling, or other commerical structure, and a municipal sewer line, for the purpose of interrupting the backflow of sewer water into the structure under extreme conditions. Further, the present system is intended to be operated strictly by hydraulic fluid under pressure, as opposed to electromotive energy. The present system is designed to be interconnected with the main water pressure line which is generally employed to provide potable water to the structure, and has a fluid pressure of anywhere from 30 to 50 pounds per square inch. It has been found that such a pressure is sufficient to operate the gate valve system of the present invention without the need of any electromotive source of energy. Hence, the valve system employed in the present system and invention operates totally in conjunction with fluid under pressure, and operates to alternately open and close the gate valve in response to the rise or lowering of the sewer water level in a holding chamber. An advantage of the present invention is that an automatic gate valve assembly is provided for preventing sewer back-up without the need of electromotive energy, and further, the system being greatly simplified in terms of structure and operation.

BRIEF DESCRIPTION OF DRAWINGS

FIG. 1 is a side elevational view, in cross section, and partly broken away, showing the automatic gate valve system of the present invention including the holding chamber, and the valving assembly associated therewith;

FIG. 2 is a side elevational view, in cross section, and partly broken away, showing the automatic gate valve system of the present invention with the valving assembly positioned such as to provide hydraulic fluid pressure to the gate valve assembly thereby to close the gate valve and prevent sewer back-up;

FIG. 3 is a side elevational view, in cross section, and partly broken away, showing the valving assembly of the present invention in its operative position wherein the cylinder assembly is designed to dump water into the chamber thereby to relieve the pressure on the gate valve and open the same thereby to establish a normal fluid path for sewer water to exit from the static structure; and FIG. 4 is a perspective view, showing the chamber as interposed in the sewer line, and having the entire gate valve assembly mounted on the top lid thereof such that the assembly may be easily disassembled for either repair or replacement purposes, and easy reassembly thereof.

DETAILED DESCRIPTION OF DRAWINGS

Figure 5:
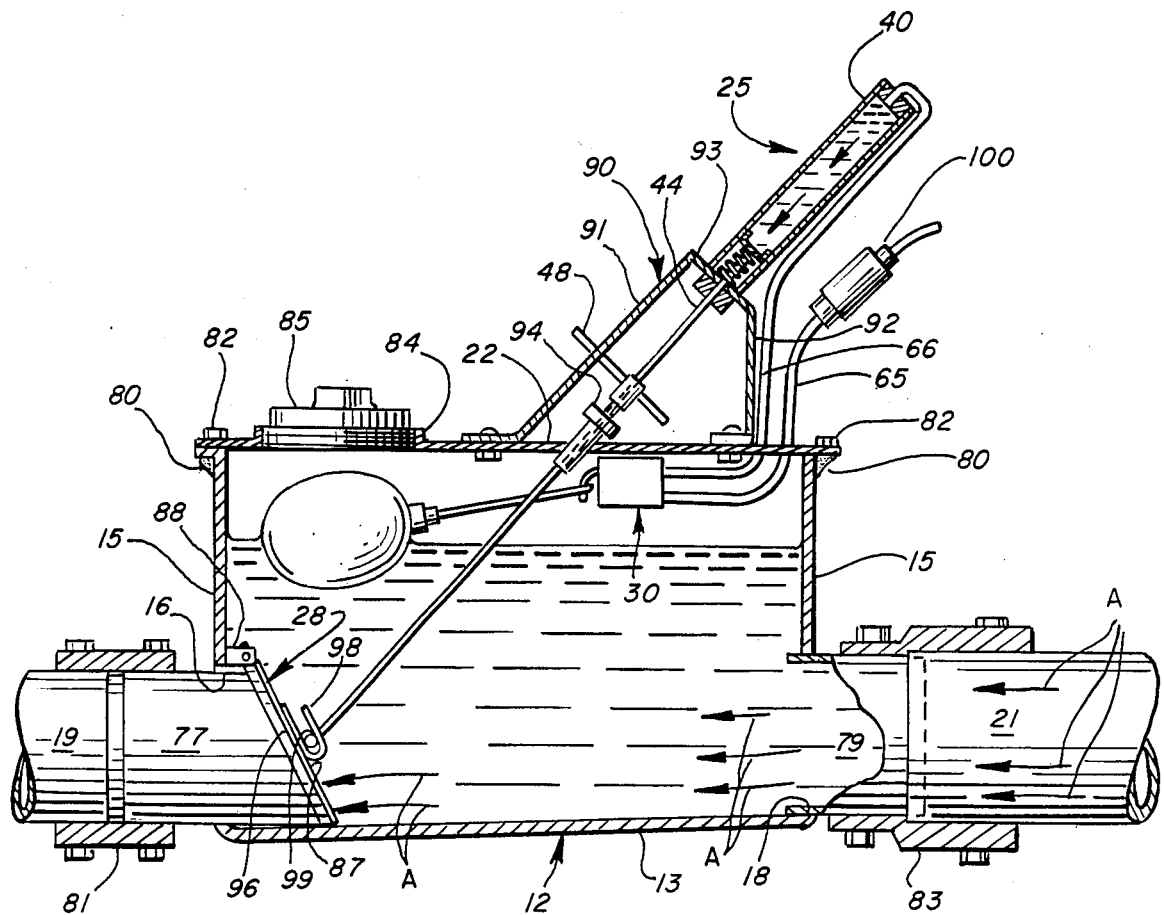
FIG. 5 is a side elevational view, partly in cross section, showing still another embodiment of the present invention having the cylinder assembly mounted in an angular disposition relative to the top lid, and the gate valve similarly angularly inclined to permit the fluid back-flow pressure to aid in the closing of the gate.
Figure 6:
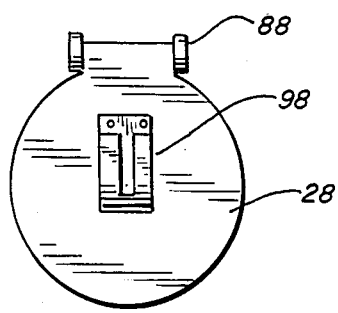
FIG. 6 is a back elevational view of the construction of the gate means utilized in the embodiment as shown in FIG. 5 of the drawings.

With specific reference to the drawings, FIG. 4 illustrates the entire gate valve assembly contemplated by the present invention. As shown therein, the gate valve assembly, generally, is referred to by the numeral 10. There is provided a chamber 12 which is formed by a bottom wall 13, opposed side walls 14, and opposed end walls 1 respectively. As shown in FIG. 4, the chamber 12 includes a water inlet 16, and a water outlet 18. It is apparent that the water inlet 16 is intended to be interconnected with the sewer line 19 which exits from the typical structure such as a home or the like, while the water outlet 18 interconnects with the municipal sewer line 21 which carries sewer water to the main municipal sewer system. It will therefore be appreciated that the principal method for installation of the present system is to create an opening at the point where the sewer line exits from the housing structure, or other structure, and empties into the municipal sewer line, and to install the chamber 12 therein. The chamber 12, in normal operation, serves as nothing more than a conduit through which sewer water will pass from the water inlet 16, through the chamber 12, and exits the chamber 12 via the water outlet 18 and enters the municipal sewer line 21. Hence, under normal operating conditions, sewer water will simply flow through the chamber 12.

The chamber is enclosed by means of the top lid 22, which basically carries the entire valving assembly for controlling the gate valve assembly 10 of the present invention. Hence, the top lid 22 is shown to carry the cylinder assembly 25, mounted on the upper surface 23 of the top lid 22, and carries the valve block means 30 and the valve block actuating means 35 along the under side 27 of the top lid 22. The cylinder assembly 25 is shown to have the gate plate 28 interconnected thereto, and extends downwardly from the underside 27 of the top lid 22 which, in its operating condition, will be in operative relation to the water inlet 16 of the chamber 12.

The embodiment disclosed herein illustrates the gate plate 28 being in a vertically reciprocating arrangement with respect to the water inlet 16 thereby to open and close the water inlet 16 as the system operates. It will be appreciated, however, that the system may be designed to have the gate plate 28 hingedly secured to open and close, or indeed, may assume any mechanical equivalent thereto such that the water inlet 16 of the chamber 12 is designed to be opened and closed in response to the operation of the system. The present embodiment is intended to illustrate what is considered to be a convenient and easily manufactured mechanical method of achieving the desired result.

It will also be observed that the chamber 12 is provided with a pair of opposed rails 31 and 32 which are positioned in opposed relationship relative to the water inlet 16, and extending upwardly therefrom, and are adapted to provide a guide means for guiding the gate plate 28 as the same opens and closes relative to the opening and closing of the water inlet 16. A more detailed explanation of the method by which the gate plate 28 operates will be set forth hereinafter.

It will also be appreciated that once the top lid 22 is installed over the chamber 12, virtually the entire chamber is in fluid tight sealing engagement. Indeed, it is contemplated that the top lid 22 will be provided with some sort of fastening means (not shown) which may be engaged once the top lid 22 is placed in position to enclose the chamber 12. Suitable fastening means may be screws, bolt anchors, or the like. It is further contemplated that once the chamber 12 is installed in position, the top lid 22 would remain visible and available to the user such that upon disengaging the fastening means, the entire top lid 22 with the valve block means 30 and valve block actuating means 35 attached thereto, may be removed for ease of repair or replacement of any of the parts. Hence, the operating portions of the system are easily and readily available to the user thereof.

With respect to the operation of the system, FIGS. 1, 2 and 3 clearly illustrate the method of operation.

With specific reference to FIG. 1 of the drawings, the system is illustrated in its open position, that is, with the gate plate 28 in its open position whereby the water inlet 16 is open. In this position, sewer water exiting from the structure comes out of the system via the water inlet 16, passes through the chamber 12, and exits through the water outlet 18 into the municipal system. With specific reference to FIGS. 1 and 4 of the drawings, the cylinder assembly 25 is shown to be mounted to the upper surface 23 of the lid 22. The cylinder assembly consists of a U-shaped mounting bracket 37 which is fixedly secured to the upper surface 23 of the lid 22. The U-shaped mounting bracket 37 includes an upper support surface 38 to which the hydraulic cylinder 40 is attached. The hydraulic cylinder 40 is basically an enclosed hydraulic cylinder having an interior chamber 42 (FIGS. 1 and 2) and carries therein a cylinder piston 44. The upper end of the cylinder piston 44 carries a cylinder ring 45 which, in operation, is in fluid tight sealing relationship relative to the interior side walls 43 of the interior chamber 42 of the cylinder 40. It will further be observed that the cylinder piston 44 is reciprocably removable within the confines of the interior chamber 42 of the cylinder 40, and, as will be described more fully hereinafter, reciprocably moves in response to the fluid pressure created by the introduction of fluid pressure within the cylinder 40. There is also shown a coil spring 47 which seats beneath the cylinder ring 45 and in fact, is interposed between the lower portion of the cylinder ring 45, and the bottom wall 41 of the cylinder 40. It will therefore be appreciated that the coil spring 47 tends to normally biasingly urge the cylinder ring 45 upwardly, and hence, maintains the cylinder piston 44 in its upper withdrawn position when the entire system is in its normal resting position. As shown in FIG. 4 of the drawings, the lower end of the cylinder piston actually extends outwardly beyond the cylinder 40, and connects to the gate plate 28 at its lower end. Hence, with the cylinder piston 44 in its raised position, the gate plate 28 will similarly be in its raised position within the guide rails 31 and 32 respectively, thereby maintaining the water inlet 16 of the chamber 12 in its open position. In this position, it will be appreciated that sewer water will normally flow from the water inlet 16 through the chamber 12 and exit from the chamber through the water outlet 18 into the main municipal sewer line 21.

It will also be observed from a view of the drawings that the upper end of the cylinder 40 includes a fluid inlet 49 through which water fluid may be introduced into the interior confines of the cylinder 40. It will be appreciated that as fluid is introduced into the cylinder 40 via the fluid inlet 49, the fluid pressure will work against the force of the coil spring 47 by bearing against the cylinder ring 45, thereby depressing the piston 44 downwardly, causing the gate plate 28 to ride between the rails 31 and 32, and thereby occlude or close the water inlet 16 in the chamber 12. The present system also contemplates the reverse procedure whereby fluid contained within the chamber 42 of the cylinder 40 will be expelled from the cylinder 40 when fluid pressure is relieved such that the action of the coil spring 47 acting upon the cylinder ring 45 will push the piston upwardly, thereby expunging the fluid from the cylinder 40 through the inlet 49 and to an exit port to be described hereinafter. It will therefore be appreciated that the hydraulic operation of the cylinder 40, by actuating the cylinder piston 44 carried therein into either an upwardly direction, or a downwardly direction, will operate the gate plate 28 to open or close the water inlet 16 of the chamber 12.

FIGS. 1 and 3 of the drawings illustrate the assembly in its normal position operating under normal conditions, that is, a lack of any excessive flooding or sewer back-up conditions. FIG. 2 of the drawings illustrates the system in its operational condition under extreme conditions where there has been a sewer back-up or other flooding conditions such that the gate plate 28 is induced to close, thereby shutting off the structure sewer line from the municipal sewer line. The actuation of the system will now be described.

As shown in FIGS. 1 and 2 of the drawings, the actuating system for the gate valve assembly 10 of the present invention resides in the provision of a valve block means 30, and a valve block actuating means 35. The valve block means 30 is shown to be mounted to the underside 27 of the top lid 22. The valve block means 30 consists of a valve block housing 50 which is substantially enclosed. The housing 50 includes an interior chamber 52 in which is carried a valve block 60. The valve block housing 50 is also provided with a fluid inlet port 53, a first fluid outlet port 54 and a second fluid outlet port 55. The valve block 60 is designed to be reciprocably movable within the confines of the interior chamber 52 of the valve block housing 50. The interior chamber 52 is also shown to accommodate a coil spring 57 which tends to normally biasingly urge the valve block 60 into a position away from the end wall 56 of the valve block housing 50. It will also be observed that the second fluid outlet port 55 formed in the valve block housing 50 drains directly into the chamber 12.

The valve block 60 is shown to be provided with a first flow line 61 formed therein, and a second flow line 63 similarly formed therein. The first flow line 61 is shown to be U-shaped in configuration, and is dimensioned such that in its operative position as depicted in FIG. 2 of the drawings, the first flow line 61 will be positioned in registry with the fluid inlet port 53 and first fluid outlet port 54 formed in the valve block housing 50. The second flow line 63 formed in the valve block 60 is adapted and dimensioned to be in registry with the first fluid outlet port 54 in the valve block housing 50 when the valve block 60 is extended to its normal resting position by means of the coil spring 57, all as shown in FIGS. 1 and 3 of the drawings.

As shown in FIGS. 1, 2 and 3 of the drawings, the fluid inlet port 53 formed in the valve block housing 50 is interconnected by means of a supply pipe 65 to a source of water under pressure, that typically being the main water supply line for the structure in which the system is located. It is well known that all homes, residential buildings, commercial buildings or other structures are in fact provided with a main water supply line which generally emanates from a municipal water system to supply water to the subject structure. Typically, water supplied in municipal water lines ranges anywhere from 30 to 50 pounds per square inch of pressure, and has been found sufficiently adequate to operate the gate valve assembly 10 of the present invention. It will be noted that the supply pipe 65 extends through the top lid 22, and interconnects with the fluid inlet port 53 of the housing 50.

The first fluid outlet port 54 formed in the valve block housing 50 is interconnected by means of an exit pipe 66 to the fluid inlet port 49 of the cylinder 40. Once again, the exit pipe 66 extends through the top lid 22, and may be secured by any appropriate pipe fittings as is well known in the art.

As illustrated in FIGS. 1 and 3 of the drawings, when the valve block 60 is biasingly urged into its resting position by means of the coil spring 57 contained within the chamber 52 of the valve block housing 50, the second flow line 63 in valve block 60 is positioned in registry with the first fluid outlet port 54 contained in the valve block housing 50. This also positions second flow line 63 in registry with the second fluid outlet port 55 contained in the valve block housing 50, such that there is a direct fluid pathway established via the exit pipe 66, through the first fluid outlet port 54 of housing 50, through the second flow line 63 in the valve block 60, and exiting through the second fluid outlet port 55 in the valve block housing 50 draining directly into the interior confines of the chamber 12. It will be appreciated that in this position, any fluid existing within the interior chamber 42 of the hydraulic cylinder 40 will flow via the exit pipe 66 and empty into the chamber 12. This action will be induced by means of the coil spring 47 pushing against the cylinder ring 45 of the cylinder piston 44 moving the piston 44 into an upward direction as viewed in FIGS. 1-3 of the drawings. By expunging the fluid from the interior confines of the cylinder 40, the gate plate 28 will be in its raised or open position thereby allowing free flow of sewer water through the chamber 12 and exiting therefrom via the water outlet 18.

To actuate the system, there is provided a simple valve block actuating means 35 consisting of a float arm 70 of the type commonly utilized in toilet flush tanks. The float arm 70 is pivotally connected to the valve block housing 50 by means of a connecting arm 71 which will ultimately bear against a trigger rod 75 which is fixedly secured to the valve block 60. As shown in FIG. 2 of the drawings, if a water back-up condition ensues such that the water level within the chamber 12 begins to rise, the float arm 70 will rise, causing the connecting arm 71 to bear against the trigger rod 75. This will cause the valve block 60 to hydraulically push against the action of the coil spring 57 and forces the valve block 60 into an operating condition whereby the first U-shaped flow line 61 formed in the valve block 60 will come into registry with the fluid inlet port 53 and first fluid outlet port 54 in the valve housing 50. It will be observed from FIG. 2 of the drawings, that once this fluid path is established, water pressure existing in the supply pipe 65 will force its way through the first flow line exiting via the exit pipe 66 and enter into the cylinder 40 via the cylinder fluid inlet 49. Given the fact that the water pressure at that point is between 30 and 50 pounds per square inch, it will bear against the upper surface of the cylinder ring 45 pushing the cylinder piston 44 downwardly against the action of the coil spring 47. In view of the fact that the cylinder piston 44 is connected to the gate plate 28, the gate plate 28 will ride down the guide rails 31 and 32 until it has totally occluded the water inlet 16. This will cause the sewer water heretofore backing up into the chamber 12 to stop, and will remain in that condition until the float arm 70 once again rides downwardly due to a decrease in the water pressure.

It will also be appreciated that once the severe conditions causing the sewer back-up have ceased to exist, severe water will exit the system via water outlet 18 and the water level within the chamber 22 will commence to decline. As that occurs, the float arm 70 will begin to move downwardly, relieving the pressure on the trigger rod 75. The action of the coil spring 57 contained within the valve block housing 50 will push the valve block 60 outwardly away from the end wall 56 until a flow path is established as between the first fluid outlet port 54, second flow line 63 in valve block 60, and second fluid outlet port 55 in the valve block housing 50. Once that flow path is established as depicted in FIGS. 1 and 3 of the drawings, the action of the coil spring 47 contained within the cylinder 40 will push against the cylinder ring 45, which in turn will force the water to flow outwardly via the fluid inlet 49 of the cylinder 40 through the exit pipe 66 and will drain directly into the chamber 12. This action causes the gate plate to rise upwardly, thereby totally opening the water inlet 16 and reestablishing the sewer flow path into the main municipal sewer line 21.

With respect to FIG. 5 of the drawings, an altered embodiment of the device of the present invention is illustrated. For ease of description, like parts will be numbered with the same numerals, as to those parts which are considered to be virtually identical.

As with the embodiment previously described, there is shown a chamber 12 formed by a bottom wall 13, side walls 14, and end walls 15. There is also provided a water inlet 16 and a water outlet 18. The water inlet is connected to the structure sewer line 19, and the water outlet 18 is connected to the municipal sewer line 21. In this embodiment, it is contemplated that the chamber 12 may further be provided with a built-in inlet sewer pipe 77, while the water outlet 18 is similarly provided with a build-in, outlet sewer pipe 79. As is shown in FIG. 5 of the drawings, the structure sewer line 19 may be interconnected to the inlet sewer pipe 77 by means of a coupler 81 while the outlet sewer pipe 79 is similarly connected to the municipal sewer line 21 by means of an outlet pipe coupler 83. Couplers such as depicted by structures 81 and 83 are well known in the art and are available as pipe couplers.

The chamber 12 is completed by means of a top lid 22 which is suitably fastened in position, which in the present embodiment is shown to consist of threaded bolts and nuts 80 and 82 respectively. The embodiment as depicted in FIG. 5 is shown to further include an inspection hole 84 which is enclosed by means of a threaded coupler 85. The inspection hole 84 is provided for permitting the end user to attend to any problems which may exist with respect to the gate plate 28 and its fitting relationship over the inlet end of the inlet sewer pipe 77. The threaded cover 85 merely encloses the inspection hole 84 in a fluid tight sealing relationship.

The principal difference between the embodiment as depicted in FIG. 5, and the prior embodiments is that the gate plate 28 and the relationship with the cylinder assembly 25 is shown to be angularized. It will be observed that the inlet sewer pipe 77 has a truncated inner lip 87, and that the gate plate 28 is pivotally mounted to the end wall 15 by means of a hinge bracket 88.

It will be observed that the cylinder 40 is mounted to the top lid 22 by means of a trapezoidal bracket 90 which is formed by an elongated leg 91, and a shorter leg 92. Hence, the upper support surface 93 of bracket 90 will cause the cylinder 40 to sit at an angle relative to the top lid 22, and be positioned in a direct line such that the cylinder piston 44 is designed and adapted to mount to the inner surface of the gate plate 28. It will also be observed that if desired, the top lid 22 may be provided with a fluid tight fitting 94 through which the cylinder piston 44 passes in order to insure that sewer water contained within the chamber 12 does not back-up through the opening accommodating the cylinder piston 44 therethrough.

In the present embodiment, the gate plate 28 is designed to pivotally swing into an open and closed position relative to the inlet sewer pipe 77, the gate plate 28 shown in its closed position in FIG. 5. In order to insure a fluid tight seal as between the gate plate 28 and the inner lip 87 of the sewer pipe 77, the inner surface of the gate plate 28 is covered with a neoprene or rubberized pad 96 which seats against the truncated inner lips 87 of the sewer pipe 77. Furthermore, the point of connection as between the cylinder piston 44 and the rear of the gate plate 28 is accomplished by means of a slide bracket 98 which accommodates a ball connector 99.

It will be observed that the embodiment as depicted in FIG. 5 is similarly provided with a valve block means 30, and a float arm 70 to function in the manner heretofore described with respect to the prior embodiments described above.

The advantage achieved by the design of the present embodiment is that as sewer water is in the back-up condition flowing in the direction of the solid arrows "A", water will fill the chamber 12 causing the float arm 70 to rise upwardly, which in turn triggers the valve block means as previously indicated. This will activate the cylinder 40 to force the cylinder piston downwardly pressing against the gate plate 28 to pivotally move it into its closed position overlying the truncated inner lip 87 of the sewer pipe 77. In the present embodiment, the pressure of the sewer water flowing backwards into the chamber 12 (solid black arrows "A") will put water pressure against the back of the gate plate 28, thus aiding the action of the cylinder piston 44 in pushing the gate plate into its closed position. Furthermore, the rubberized backing 96 on the gate plate 28 will form a fluid tight seal as against the truncated inner lip 87 of the sewer pipe 77 thereby assuring that the gate plate 28 completely closes off the inlet opening 16. Hence, by positioning the entire cylinder assembly 25 and the gate plate 28 in an angularized disposition, the design enables the force of the backed-up sewer water to aid in the closing of the gate plate 28 and insuring a fluid tight seal.

It will further be observed that the embodiment of the present invention includes a check valve 100 positioned in line with the water supply line coming into the valve block means 30. The check valve 100 will further assure that water will not backup through the valve block means 30 into the water supply line, since this is the same supply line which provides potable water for the structure.

It will also be observed that as with the previous embodiment, the embodiment as depicted in FIG. 5 also includes a manual handle 48 which permits the operator to manually operate the device if desired. The elongated arm 91 of the bracket 90 is similarly slotted (not shown) to accommodate the locking of the manual handle 48 in its lowered closed position as depicted in FIG. 5.

In all other respects, the device as depicted in FIG. 5 of the drawings is simply an alternate embodiment, and is designed to simply use the force of the sewer water as additional force against the gate plate 28 to insure a fluid tight seal when the device has been activated to close the gate plate and seal off the water inlet 16 to prevent sewer back-up into the structure sewer line.

It will be appreciated from the above description that the present invention provides a gate valve assembly which is intended to operate strictly off of water pressure, that being the water pressure existing in the main water line which supplies potable water to any given structure in any given municipality. This eliminates the necessity of having any electromotive energy associated with the gate valve assembly, and eliminates the need of having electrical power located in and adjacent to a sewer shut-off system. Furthermore, the system may be employed in virtually any community in view of the fact that typically, water pressure existing in the main water supply lines is of the order of 30 to 50 pounds per square inch. That pressure level has been found to be more than adequate to operate the system of the present invention, and certainly is sufficient to operate the gate valve into its closed position.

It will also be appreciated from the above description that the automated gate valve assembly of the present invention is further designed with a view toward ease of repair and replacement of any parts which may cease to be operational. As observed in FIG. 4 of the drawings, the cylinder assembly as well as the valve block, and the actuating float arm, are all mounted to the top lid and are within the easy removal from the chamber for servicing purposes.

It will further be observed in FIG. 4 of the drawings, that the system is also provided with a manual actuating means which may be operated in the unlikely event that there is an interruption of the water pressure in the main water line. It will be observed that the piston 44 is provided with a manual handle 48 which is secured thereto externally of the cylinder 40, and that the U-shaped mounting bracket 37 is provided with a pair of opposed retention notches 39 formed therein. In the unlikely event that there is an interruption in the main water supply line for the water system associated with the residence, the operator may simply grasp the handle 48, and push against the action of the coil spring 47 until the handle 48 can be inserted in the retention notches 39 which, in effect, has now forced the gate plate 28 into its closing position occluding the water inlet 16. The process may be easily reversed by simply disconnecting the handle from the retention notches 39 whereby the piston 44 will immediately be retracted by the action of the coil spring 47 operating against a cylinder ring 45.

It is thus appreciated that the automatic gate valve system of the present invention is intended to provide a much more simplified system than heretofore has existed, and which further, operates off of the main water pressure line which is provided and supplies every structure with potable water from the municipal water system. It is further observed that all of the parts involved in the present system are basically simple parts which may be formed of appropriate steel or plastic materials, and because of their positioning on the top lid of the container, may be easily serviced either for repair or replacement purposes. Furthermore, installation of the subject system has been greatly simplified since all that is required in order to activate the system, once it is in place, is to provide the main water line with a saddle valve of the type typically known in the art, from which an interconnection can be made via the supply pipe 65 to the present system. Hence, the present system may, if desired, be installed by a typical homeowner without the need of complicated equipment or exotic engineering plans.

While there has been described what is at present considered to be the further embodiment of the invention, various modifications may be made therein without departing from the true spirit and scope of the invention. It is intended to cover in the appended claims all such modifications as fall within the true spirit and scope of the present invention.

I claim:

1. A non-electric fluid actuated automatic gate valve assembly of the type for interposition in a typical sewer line system interconnecting a structure with a muncipal sewer line and for preventing sewer back-up in flood conditions comprising in combination, an enclosed chamber having a water inlet and a water outlet spaced in opposed relation thereto, said chamber being adapted to allow sewer water to pass therethrough under normal operating conditions, said water inlet having a fluid actuated gate valve assembly associated therewith, said fluid actuated gate valve assembly comprising gate means for alternately opening and closing said water outlet, fluid actuated control means in operative relation with said gate means, and being in fluid communication with a source of fluid under pressure, said fluid actuated control means including a removable chamber cover, said chamber cover including, (a) fluid actuated controller means in operative connection with said gate means for alternately opening and closing said gate means in response to fluid pressure supplied thereto, (b) valve block means interposed between said chamber and said fluid actuated controller means for controlling the fluid pressure within said controller means, (c) valve block actuating means interposed between said chamber and said valve block means for sensing the water level within said chamber and adapted to activate said valve block means in response to a rise in water level thereby to concommitantly actuate said fluid actuated controller means and close said gate means in a high water condition within said chamber and alternatively actuate said valve block means and concommitantly said fluid actuated controller means to open said gate means in a low water condition within said chamber, whereby said fluid actuated control means is operated by a fluid under pressure thereby to operate said gate valve assembly without the need for electromotive energy, and.

2. The non-electric fluid actuated automatic gate valve assembly of the type described and claimed in claim 1 above, wherein said chamber is operatively positioned in the main municipal sewer line between a structure and the main municipal sewer line system.

3. The non-electric fluid actuated automatic gate valve assembly of the type described and claimed in claim 2 above, wherein said gate means comprises a fluid actuated gate plate mounted in operative relation to said water inlet in said chamber and adapted to alternately open and close said water inlet in response to the operation of said fluid activated control means.

4. The non-electric fluid actuated automatic gate valve assembly of the type described and claimed in claim 3 above, wherein said gate plate is mounted within said chamber and adapted for vertical reciprocation between an open position permitting the free flow of fluid outwardly through said water inlet, and a closed position shutting said water inlet and occluding said opening to the passage of fluid therethrough.

5. The non-electric fluid actuated automatic gate valve assembly of the type described and claimed in claim 4 above, wherein said fluid actuated controller means comprises a hydraulic cylinder of the type formed by enclosed chamber having a continuous interior chamber wall and provided with a fluid inlet opening and having a cylinder piston mounted thereon and adapted for reciprocating movement, said cylinder piston having a piston ring mounted thereon and being in fluid tight sealing relation with respect to said cylinder chamber wall, said cylinder piston having a lower end extending outwardly from said cylinder and being mounted to said gate plate thereby to control the reciprocating movement of said gate plate in response to the reciprocating movement of said piston within said hydraulic cylinder.

6. The non-electric fluid actuated automatic gate valve assembly of the type described and claimed in claim 5 above, wherein said valve block means comprises a valve block housing mounted on said gate valve assembly, and having a fluid inlet in fluid communication with a source of fluid under pressure, a first fluid outlet in fluid communication with said cylinder fluid inlet, and a second fluid outlet positioned therein, said valve block housing having an interior chamber for accommodating a valve block reciprocably carried therein, said valve block having a first flow line formed therein adapted for operative movement to a position thereby to establish a fluid pathway between said valve block housing fluid inlet and said valve block housing first fluid outlet, and a second flow line formed therein adapted for operative movement to a position to establish a fluid pathway between said valve block housing first fluid outlet and said valve block housing second fluid outlet, said valve block first and second flow lines being formed such that the establishment of a fluid pathway between said valve block housing inlet, first fluid outlet via said valve block first flow line occludes all other fluid pathways, while the establishment of a fluid pathway between said valve block housing first fluid outlet and second fluid outlet via said valve block second flow line occludes all other fluid pathways, and valve block actuating means for controlling the reciprocation of said valve block in response to the water level within said enclosed chamber thereby to operate said cylinder piston and concommitantly said gate plate to open and close same respectively in response to the water level within said chamber.

7. The non-electric fluid actuated automatic gate valve assembly of the type described and claimed in claim 6 above, wherein said valve block actuating means comprises a float valve mounted on said valve block housing adapted for flotation within said chamber in response to the water level therein, said float valve including a control rod interconnected between said float valve and said valve block thereby to control the reciprocation of said valve block between the respective fluid inlet, first fluid outlet and second fluid outlet flow lines formed therein and the cylinder fluid inlet formed in said hydraulic cylinder.

8. The non-electric fluid actuated automatic gate valve assembly of the type described and claimed in claim 7 above, wherein said valve block housing is provided with biasing means for normally biasingly urging said valve block into a normal resting position wherein said second fluid flow line in said valve block is in fluid communication with said cylinder fluid inlet such that fluid will normally be extinguished from said hydraulic cylinder.

9. The non-electric fluid actuated automatic gate valve assembly of the type set forth in claim 1 above, wherein said water inlet formed in said chamber includes an inner truncated surface, and said gate means is positioned for overlying said truncated inner end of said water inlet, and said fluid actuated controller means is angularly positioned and in a direct line with said gate means, thereby to control the opening and closing of said gate means relative to said water inlet.

10. The non-electric fluid actuated automatic gate valve assembly of the type described and claimed in claim 2 above, wherein said enclosed chamber has an open top end and further includes a top lid having an upper surface and an under side for completely enclosing said chamber, said top lid carrying said hydraulic cylinder assembly on the upper surface thereof and having said gate means carried along the under side thereof, and said valve block means and said valve block actuating means being mounted on the under side of said top lid such that the operative components of said gate valve assembly are mounted on said top lid and are removable therewith for ease of repair and replacement.

11. The non-electric fluid actuated automatic gate valve assembly of the type described and claimed in claim 10 above, wherein said top lid is further provided with an inspection aperture traversing therethrough, said aperture provided with a cover adapted to engage and disengage from said aperture, thereby to permit inspection and servicing of the assemblies located within the confines of said chamber.

12. The non-electric fluid actuated automatic gate valve assembly of the type described and claimed in claim 3 above, wherein said enclosed chamber further includes a pair of guide rails, one of each of said rails being mounted on opposed sides of said water inlet and extending upwardly therefrom, and said gate plate being mounted within said guide rails and adapted to reciprocate between an open position wherein said gate plate is positioned above said water inlet and within said guide rails and is reciprocated to a closed position occluding said water inlet when said gate plate is driven downwardly within said guide rails in response to the action of said fluid actuated control means.

* * * * *